United States Patent
Zhang et al.

(10) Patent No.: US 11,451,531 B2
(45) Date of Patent: Sep. 20, 2022

(54) CERTIFICATE OBTAINING METHOD, AUTHENTICATION METHOD, AND NETWORK DEVICE

(71) Applicant: Huawei Technologies Co., Ltd., Shenzhen (CN)

(72) Inventors: Dacheng Zhang, Beijing (CN); Tianfu Fu, Beijiing (CN); Chong Zhou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 307 days.

(21) Appl. No.: 16/456,706

(22) Filed: Jun. 28, 2019

(65) Prior Publication Data

US 2019/0327224 A1    Oct. 24, 2019

Related U.S. Application Data

(63) Continuation of application No. PCT/CN2017/101307, filed on Sep. 11, 2017.

(30) Foreign Application Priority Data

Dec. 28, 2016 (CN) .......................... 201611238763.5

(51) Int. Cl.
*H04L 9/40* (2022.01)
*H04L 9/32* (2006.01)

(52) U.S. Cl.
CPC ........ *H04L 63/0823* (2013.01); *H04L 9/3268* (2013.01)

(58) Field of Classification Search
CPC ..... H04L 63/0823; H04L 9/3263–3268; G06F 21/33–335; G06Q 20/38215
See application file for complete search history.

(56) References Cited

U.S. PATENT DOCUMENTS

| 9,009,856 B2 | 4/2015 | Draluk et al. | |
| 2010/0229242 A1* | 9/2010 | Iga | G06F 21/51 726/27 |

(Continued)

FOREIGN PATENT DOCUMENTS

| CN | 101714201 A | 5/2010 |
| CN | 101854624 A | 10/2010 |

(Continued)

OTHER PUBLICATIONS

Machine Translation and Abstract of Chinese Publication No. CN102710640, Oct. 3, 2012, 29 pages.

(Continued)

*Primary Examiner* — Matthew T Henning
(74) *Attorney, Agent, or Firm* — Conley Rose, P.C.

(57) ABSTRACT

A certificate obtaining method, an authentication method, and a network device, where a certificate is used for permission authentication when an application APP accesses an application programming interface (API) of a controller. The certificate includes one or more of: (a) information about operation permission of the APP on N application programming interfaces APIs of the controller, (b) identifiers of L APIs that are of the N APIs and that the APP has permission to operate, or (c) identifiers of R APIs that are of the N APIs and that the APP does not have permission to operate.

20 Claims, 7 Drawing Sheets

(56) References Cited

U.S. PATENT DOCUMENTS

| | | |
|---|---|---|
| 2013/0160147 A1 | 6/2013 | Draluk et al. |
| 2014/0075574 A1 | 3/2014 | Zheng et al. |
| 2014/0245397 A1* | 8/2014 | Lim .................... H04W 12/37 |
| | | 726/4 |
| 2014/0344877 A1 | 11/2014 | Ohmata et al. |
| 2016/0014149 A1* | 1/2016 | Bradley ............. H04L 63/1425 |
| | | 726/14 |
| 2018/0211015 A1 | 7/2018 | Yach et al. |

FOREIGN PATENT DOCUMENTS

| | | |
|---|---|---|
| CN | 102710640 A | 10/2012 |
| CN | 102819715 A | 12/2012 |
| CN | 105704154 A | 6/2016 |
| EP | 2787725 A1 | 10/2014 |
| JP | 2002351563 A | 12/2002 |
| JP | 2006293417 A | 10/2006 |
| JP | 2016019203 A | 2/2016 |
| WO | WO-0133340 A2 * | 5/2001 ......... H04L 63/0815 |
| WO | 2005101162 A1 | 10/2005 |
| WO | 2015118751 A1 | 8/2015 |
| WO | 2016013200 A1 | 1/2016 |

OTHER PUBLICATIONS

Machine Translation and Abstract of Chinese Publication No. CN105704154, Jun. 22, 2016, 20 pages.

Foreign Communication From A Counterpart Application, PCT Application No. PCT/CN2017/101307, English Translation of International Search Report dated Dec. 14, 2017, 2 pages.

Foreign Communication From A Counterpart Application, PCT Application No. PCT/CN2017/101307, English Translation of Written Opinion dated Dec. 14, 2017, 4 pages.

Foreign Communication From A Counterpad Application, European Application No. 17886998.8, Extended European Search Report dated Nov. 5, 2019, 8 pages.

\* cited by examiner

| API identifier | Operation permission |
|---|---|
| API 1 | Y |
| API 2 | N |
| API 3 | Y |
| ... | ... |
| API N | N |

FIG. 3

| API identifier |
|---|
| API 1 |
| API 3 |

FIG. 4

| API identifier |
|---|
| API 1 |
| API 3 |

FIG. 5

| |
|---|
| Version number |
| Serial number |
| Algorithm identifier |
| Identity information of an issuer |
| Validity |
| Public key of a subject |
| Unique identifier of an issuer |
| Unique identifier of a subject |
| Extended information |
| Certificate signature |

| APP identifier | API identifier | Operation permission |
|---|---|---|
| APP 1 | API 1 | Y |
| | API 2 | N |
| | API 3 | Y |
| | ... | ... |
| | API N | N |
| APP 2 | API 1 | N |
| | API 2 | N |
| | API 3 | Y |
| | ... | ... |
| | API N | N |
| APP 3 | API 1 | Y |
| | API 2 | Y |
| | API 3 | Y |
| | ... | ... |
| | API N | N |
| ... | ... | ... |
| APP Z | API 1 | Y |
| | API 2 | N |
| | API 3 | Y |
| | ... | ... |
| | API N | Y |

FIG. 8

| APP identifier | List of APIs that are allowed to be operated | |
|---|---|---|
| APP 1 | API list 1 | API 1 |
| | | API 2 |
| | | API 5 |
| | | API 7 |
| APP 3 | API list 3 | API 1 |
| | | API 3 |
| | | API 4 |
| ... | ... | API 2 |
| | | API 3 |
| | | API 4 |
| APP Z | API list 1 | API 6 |
| | | API 7 |
| | | ... |
| | | API 2 |
| | | API 3 |
| | | API 4 |
| | | API 6 |
| | | API 7 |

FIG. 9

| APP identifier | List of APIs that are not allowed to be operated | |
|---|---|---|
| APP 1 | API list 1 | API 1 |
| | | API 2 |
| | | API 5 |
| | | API 7 |
| APP 2 | API list 2 | API 1 |
| | | API 3 |
| | | API 4 |
| APP 3 | API list 3 | API 2 |
| | | API 3 |
| | | API 4 |
| | | API 6 |
| | | API 7 |
| ... | ... | ... |
| APP Z | API list 1 | API 2 |
| | | API 3 |
| | | API 4 |
| | | API 6 |
| | | API 7 |

CERTIFICATE OBTAINING METHOD, AUTHENTICATION METHOD, AND NETWORK DEVICE

CROSS-REFERENCE TO RELATED APPLICATIONS

This application is a continuation of International Patent Application No. PCT/CN2017/101307, filed on Sep. 11, 2017, which claims priority to Chinese Patent Application No. 201611238763.5, filed on Dec. 28, 2016. The disclosures of the aforementioned applications are hereby incorporated by reference in their entireties.

TECHNICAL FIELD

This application relates to the field of network communications technologies, and to a certificate obtaining method, an authentication method, and a network device.

BACKGROUND

Software-defined anything (SDX) is a set of all types of software-defined computing technologies. In the SDX, software plays a main role in controlling hardware. A common SDX technology includes software-defined networking (SDN), a software-defined data center (SDDC), software-defined storage (SDS), and the like.

In an SDX architecture, a controller controls all hardware capabilities in a centralized manner. Moreover, the controller provides an application programming interface (API) for a user. Various applications (APP) of the user can access the API, to configure and manage a network device, a security device, a virtual machine, and the like that are controlled by the controller or to obtain network information.

However, because the APPs are from the outside of the controller, and may be developed by a third party and used by the user. It is necessary to control permissions of the APPs, so as to prevent misuse and abuse of the APIs of the controller.

SUMMARY

This application provides a certificate obtaining method, an authentication method, and a network device, to improve control over operation permission of an APP on an API.

A first aspect of this application provides a certificate obtaining method. According to the method, a network device sends certificate application information including an APP to a certificate generation device, and the certificate generation device generates a certificate according to the APP and sends the generated certificate to the network device. The certificate is used for permission authentication when the APP accesses an API of a controller. The certificate includes one or more of (a) to (c): (a) information about operation permission of the APP on N application programming interfaces APIs of the controller, (b) identifiers of L APIs that are of the N APIs and that the APP has permission to operate, and (c) identifiers of R APIs that are of the N APIs and that the APP has no permission to operate, where N is a natural number greater than or equal to 1, L is a natural number greater than or equal to 1, L is less than or equal to N, R is a natural number greater than or equal to 1, and R is less than or equal to N.

A second aspect of this application provides an authentication method. According to the method, an authentication device receives an access request message of an APP, and determines operation permission of the APP on N APIs of a controller based on information about operation permission carried in a certificate in the access request message. The certificate of the access request message includes one or more of (a) to (c).

A third aspect of this application provides a certificate generation device. The device includes a communications interface and a certificate generation module. The communications interface is configured to: receive certificate application information, and send the certificate application information to the certificate generation module, where the certificate application information includes an application APP. The certificate generation module is configured to: receive the certificate application information sent by the communications interface, and generate a certificate according to the APP in the certificate application information, where the certificate includes one or more of (a) to (c).

A fourth aspect of this application provides a network device. The network device includes a communications interface and an authentication module.

The communications interface is configured to receive an access request message of an application APP, where the access request message includes a digital certificate, and the digital certificate includes one or more of (a) to (c). The authentication module is configured to determine operation permission of the APP on the N APIs based on the information about operation permission.

According to a certificate obtaining method, the authentication method, and the device of this application, operation permission of an APP on an API of the controller is carried in the certificate. When accessing the API of the controller, the APP provides the certificate for the authentication device for authentication. The authentication device determines, based on the operation permission that is on the API and that is carried in the certificate, whether the APP has permission to operate the API to which the APP applies for access. This facilitates control over operation permission of the APP on the API. In addition, the method is simple, and an authentication process is simplified.

Optionally, the certificate includes (a) the information about operation permission of the APP on the N APIs of the controller, and the information about operation permission includes identifiers of the N APIs and operation permission of the APP on each of the N APIs. In this way, the authentication device can obtain information about operation permission of the APP on all APIs, and therefore can determine whether the APP has permission to operate the API currently applied for access.

Optionally, the information about operation permission includes identifiers of M API identifier sets, an identifier of each of the M API identifier sets is used to identify operation permission on K APIs in the API identifier set, M is a natural number greater than or equal to 1, K is an integer greater than or equal to 0, and K is less than or equal to N. In this way, the authentication device can determine, based on an API identifier set carried in the certificate, APIs that the APP has permission to access or a resource that is identified by the API identifier set and that the APP has permission to access.

Optionally, the certificate includes (a) the information about operation permission of the APP on the N APIs of the controller, and the operation permission is represented using a bitmap. In this way, occupation of a storage resource of the authentication device can be effectively reduced, and authentication efficiency can be improved.

Optionally, one or more of (a) to (c) are carried in extended information of the certificate. In this way, when authenticating the APP according to the certificate, the authentication device can determine access permission of the APP on the N APIs of the controller, so as to rapidly determine whether the APP has access permission on the API to which the APP currently applies for access.

Optionally, the network device is the controller or a part of the controller. The network device may be an authentication server.

Optionally, the network device is a software-defined networking SDN controller.

Another aspect of this application provides a network device. The network device includes a processor and a memory communicating with the processor. When running an instruction or a computer program stored in the memory, the processor may perform the foregoing certificate generation method or authentication method.

Still another aspect of this application provides a computer readable storage medium. The computer readable storage medium stores an instruction. When the instruction is run on a computer, the computer is enabled to perform the foregoing certificate generation method or authentication method.

Still another aspect of this application provides a computer program product including an instruction. When the computer program product is run on a computer, the computer is enabled to perform the foregoing certificate generation method or authentication method.

DESCRIPTION OF EMBODIMENTS

The following clearly describes the technical solutions in the embodiments of the present application with reference to the accompanying drawings in the embodiments of the present application. Apparently, the described embodiments are merely some but not all of the embodiments of the present application.

In this application, SDX may be SDN, an SDDC, SDS, or a software-defined infrastructure (English: software-defined infrastructure, SDI). The embodiments of this application are described below using the SDN as an example. However, the embodiments of this application are also applicable to the SDX such as the SDDC, the SDS, or the SDI.

Figure 1:
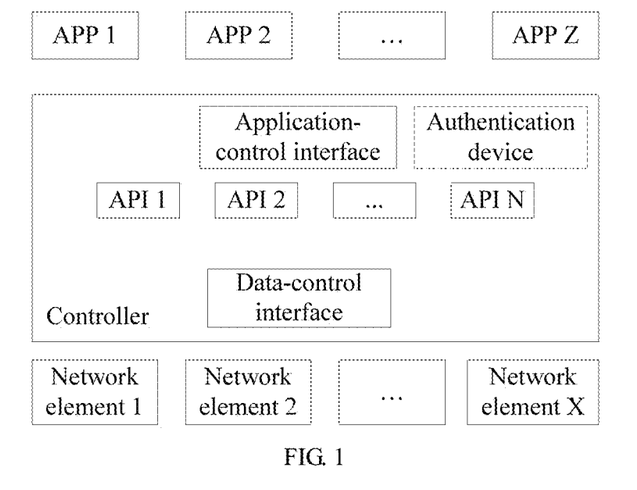
FIG. 1 is a schematic networking diagram of SDN according to an embodiment of this application.

As shown in FIG. 1, an SDN includes a controller and X network elements controlled by the controller: a network element 1, a network element 2, . . . , and a network element X. X is a natural number greater than or equal to 1. The controller includes a data-control interface and an application-control interface. Each of the network element 1 to the network element X communicates with the controller using the data-control interface, to receive a forwarding table sent by the controller, and forward a packet according to the forwarding table. X is a natural number greater than or equal to 1. Forwarding tables sent by the controller to different network elements may be the same or may be different. Applications, an APP 1 to an APP Z, communicate with the controller using the application-control interface. Z is a natural number greater than or equal to 1. The controller further provides N APIs, for example, an API 1 to an API N. N is a natural number greater than or equal to 1. Each API provides one or more resources for an application to call, so that the application can control a corresponding resource by calling the API. For example, when an application APP 1 calls the API 1, the application APP 1 may forward traffic using a bandwidth of 1 megabit per second (Mbps). Specifically, the APP 1 to the APP Z may call, using an ACI of the controller, one or more of the API 1 to the API N that are provided by the controller, so as to operate, using the controller, the network element 1 to a network element Y that are controlled by the controller.

Optionally, DCI is deployed with the OpenFlow Protocol. Optionally, the DCI may be further deployed with one or more of the Path Computation Element Communication Protocol (PCEP), the Border Gateway Protocol (BGP), the Network Configuration (NETCONF) Protocol, the Intermediate System to Intermediate System (ISIS) Protocol, and the Open Shortest Path First (OSPF) Protocol.

Optionally, the API may be an OpenStack API, an OpenFlow API, or a Representational State Transfer (RESTful) API.

In cryptology, a certificate is a public key certificate. The certificate is also referred to as a digital certificate, an identity certificate, or a security certificate. The certificate is an electronic document used to prove an identity of a public key owner. A certificate issued by a certificate issuing institution usually includes certificate validity, a public key, a subject (a certificate owner), and an algorithm used in a signature. The certificate validity represents a valid time of the certificate. The public key is a public key password used to encrypt a message. The subject (the certificate owner) is used to identify an organization using the certificate. The algorithm used in the signature is used to verify integrity of the certificate. The algorithm used in the signature may ensure that the certificate has not been tampered. A principle of the algorithm is as follows: When issuing the certificate, the certificate issuing institution calculates a hash value of the entire certificate according to a fingerprint algorithm and sends both the hash value and the certificate to a user of the certificate. When opening the certificate, the user of the certificate calculates the hash value of the certificate according to the fingerprint algorithm, and compares the calculated hash value with the hash value issued by the certificate issuing institution. If the two hash values are the same, it indicates that the certificate has not been tampered. This authentication process and standard are standardized in X.509.

Figure 2:
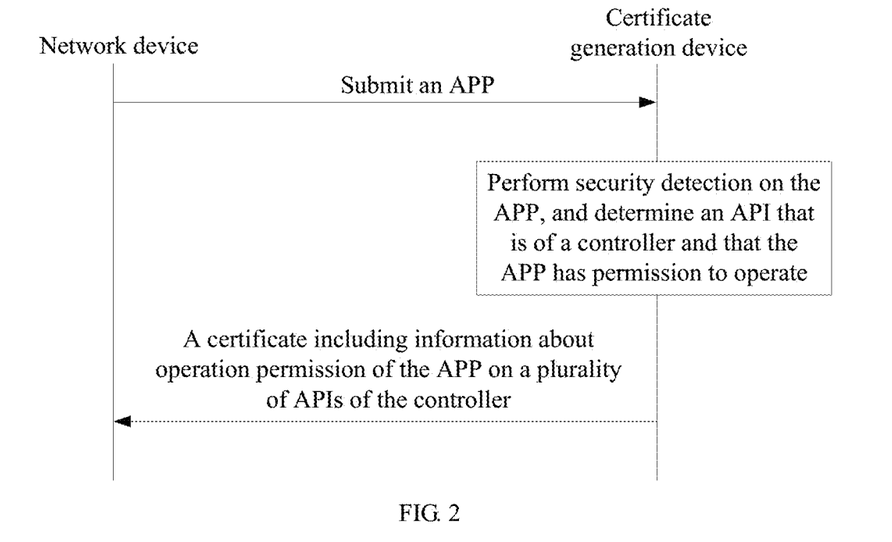
FIG. 2 is a schematic method flowchart of a certificate obtaining method according to an embodiment of this application.

As shown in FIG. 2, in a certificate obtaining method of this application, when an APP, for example, an APP 1, intends to obtain a certificate, to perform some operations by accessing one or more APIs of a controller, a network device on an owner side of the APP 1 submits the APP 1 to a certificate issuing institution. A security device of the certificate issuing institution performs security detection on the APP 1, and determines one or more of (a) to (c) based on a security detection result of the security device: (a) operation permission of the APP on each of N APIs of the controller; (b) identifiers of L APIs that are of the N APIs and that the APP has permission to operate; and (c) identifiers of R APIs that are of the N APIs and that the APP has no permission to operate. N is a natural number greater than or equal to 1. L is a natural number greater than or equal to 1, and L is less than or equal to N. R is a natural number greater than or equal to 1, and R is less than or equal to N. A certificate generation device of the certificate issuing institution generates the certificate for the APP 1. The certificate includes access permission of the APP 1 on the N APIs or a list of the L APIs that are of the N APIs and that the APP 1 has permission to operate. A certificate issuing device of the certificate issuing institution sends the certificate to the owner of the APP 1. The certificate issuing institution is an organization or a person creating a certificate. The certificate issuing institution only creates a certificate, but is not a user of the certificate.

Figure 3:
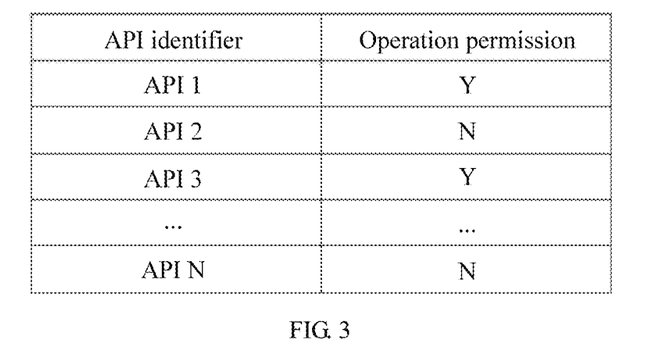
FIG. 3 is a schematic composition diagram of information that is included in a certificate and that is about operation permission of an APP on an API according to an embodiment of this application.

As shown in FIG. 3, content (a) included in the certificate may include the operation permission of the APP on each of the N APIs of the controller. In FIG. 3, an APP has operation permission on an API 1 and an API 3 of the N APIs of the controller, and has no operation permission on an API 2 and an API N. Operation permission on other APIs of the N APIs is also included in the content (a).

Figure 4:
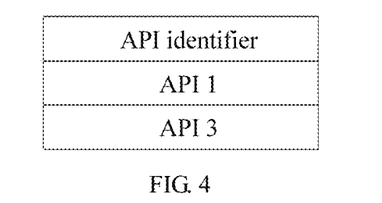
FIG. 4 is another schematic composition diagram of information that is included in a certificate and that is about operation permission of another APP on an API according to an embodiment of this application.

As shown in FIG. 4, content included in the certificate is the identifiers of the L APIs that are of the N APIs and that the APP has permission to operate. In FIG. 4, assuming that an APP has operation permission only on the API 1 and the API 3 of the N APIs of the controller, and has no operation permission on other APIs of the N APIs of the controller, the certificate may include only a list of identifiers of APIs that the APP has operation permission to operate: the API 1 and the API 3.

Figure 5:
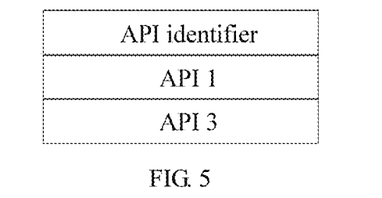
FIG. 5 is still another schematic composition diagram of information that is included in a certificate and that is about operation permission of another APP on an API according to an embodiment of this application.

As shown in FIG. 5, content included in the certificate is the identifiers of the R APIs that are of the N APIs and that the APP has no permission to operate. In FIG. 5, assuming that an APP has no operation permission only on the API 1 and the API 3 of the N APIs of the controller, and has operation permission on other APIs of the N APIs of the controller, the certificate may include only a list of identifiers of APIs that the APP has no operation permission to operate: the API 1 and the API 3.

Optionally, the performing, by a security device, security detection on the APP 1 may include: performing a sandbox test on the APP 1.

Figure 6:
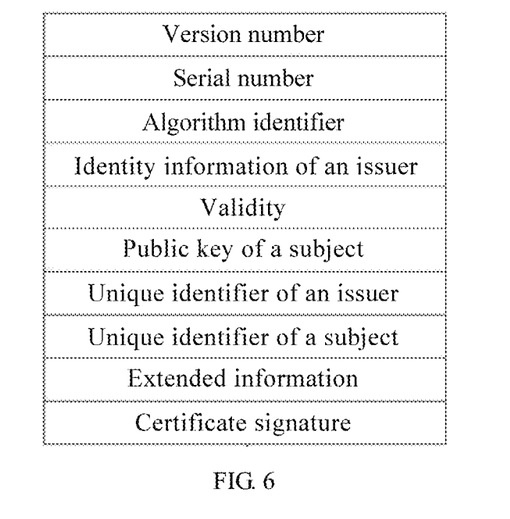
FIG. 6 is a schematic composition diagram of a certificate according to an embodiment of this application.

Optionally, as shown in FIG. 6, the certificate may follow the X.509 standard, including: (1) Subject (Subject): a distinguishable name of a certificate owner, where regarding a naming rule, an X.500 format is usually used; (2) Public key information of the subject: a public key and an algorithm identifier of the subject; (3) Certificate issuer (Issuer): including identity information and a signature of the certificate issuer; (4) Certificate validity (Validity): valid start and ending time of the certificate; (5) Management information: information such as a version, an encryption algorithm identifier, and a serial number of the certificate; and (6) Extended information (Extensions) of the certificate: including a basic constraint, a related identifier, and the like.

The extended information of the certificate may include three fields: a type, defaulted or not, and a value. The type field defines a data type in an extended value field. The type may be a simple character string, value, date, or image, or a complex data type. For ease of interaction, all data types are registered with an internationally known organization. The "defaulted or not" field is a bit flag bit. When an extended identifier is "not defaulted", it indicates that a corresponding extended value is relatively important and an application cannot ignore the information. If an application using a special certificate cannot process content in this field, the application should reject the certificate. The value field includes actual data of the extended information.

One or more of (a) to (c) may be carried in the extended information of the certificate generated by the certificate generation device.

Figure 7:
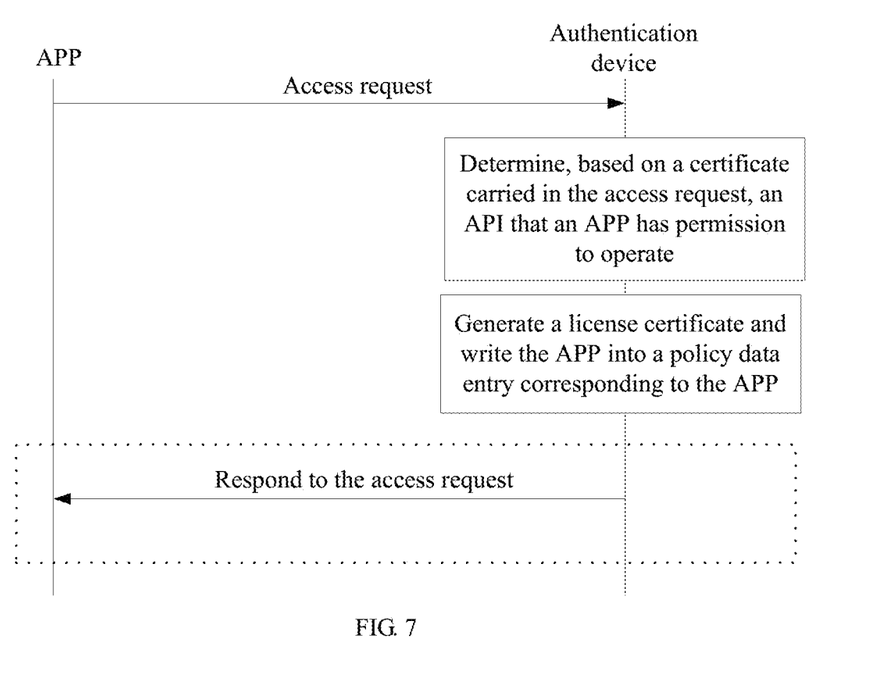
FIG. 7 is a schematic flowchart of an authentication method according to an embodiment of this application.

As shown in FIG. 7, when an APP, for example, an APP 1, tries to access a particular API, for example, an API 1, of a controller, an authentication device verifies whether a certificate provided by the APP 1 is valid. If the authentication device determines that the certificate provided by the APP 1 is valid, the authentication device further determines, based on (a) to (c) that are included in the certificate, API or APIs of the controller that the APP 1 has permission to access. The authentication device may be located on the controller, or may be independent of the controller, or the controller may serve as the authentication device to implement authentication of the APP.

Specifically, if the certificate includes content (a), information about operation permission of the APP on N APIs of the controller, the authentication device determines, based on the content (a), an API on which the APP has operation permission, and determines whether the API 1 is the API on which the APP has operation permission, that is, determines whether the API 1 is one of the N APIs of the controller. If the API 1 is one of the N APIs of the controller, the authentication device further determines whether permission of the APP 1 on the API 1 is "having operation permission". If the operation permission of the APP 1 on the API 1 is "having operation permission", the authentication device allows the APP 1 to operate the API 1. If the operation permission of the APP 1 on the API 1 is "having no operation permission", the authentication device does not allow the APP 1 to operate the API 1. Optionally, if the operation permission of the APP 1 on the API 1 is "having operation permission", in addition to allowing the APP 1 to operate the API 1, the authentication device may further return response information to the APP 1. The response information includes information indicating that the APP 1 has operation permission on the API 1.

Specifically, if the certificate includes content (b), identifiers of L APIs that are of the N APIs and that the APP has permission to operate, the authentication device determines, based on the content (b), whether the API that the APP tries to access is in the content (b), that is, determines whether the API 1 is in the content (b). If the API 1 is in the content (b), the authentication device determines that the APP 1 has operation permission on the API 1, and allows the APP 1 to operate the API 1. If the APP 1 is not in the content (b), the authentication device determines that the APP 1 has no operation permission on the API 1, and does not allow the APP 1 to operate the API 1. Optionally, if the APP 1 has operation permission on the API 1, in addition to allowing the APP 1 to operate the API 1, the authentication device may further return response information to the APP 1. The response information includes information indicating that the APP 1 has operation permission on the API 1.

Specifically, if the certificate includes content (c), identifiers of R APIs that are of the N APIs and that the APP has no permission to operate, the authentication device determines, based on the content (c), whether the API that the APP tries to access is in the content (c), that is, determines whether the API 1 that the APP 1 tries to access is in the content (c). If the API 1 is in the content (c), the authentication device determines that the APP 1 has no operation permission on the API 1, and does not allow the APP 1 to operate the API 1. If the APP 1 is not in the content (c), the authentication device determines that the APP 1 has operation permission on the API 1, and allows the APP 1 to operate the API 1.

According to the certificate generation method, the authentication method, and the controller of this application, operation permission of an APP on an API of the controller is carried in the certificate. When accessing the API of the controller, the APP provides the certificate for the authentication device for authentication. The authentication device determines, based on the operation permission that is on the API and that is carried in the certificate, whether the APP has permission to operate the API to which the APP applies for access. This facilitates control over operation permission of the APP on the API. In addition, the method is simple, and an authentication process is simplified.

Optionally, if the APP 1 has operation permission on the API 1, in addition to allowing the APP 1 to operate the API 1, the authentication device may further return response information to the APP 1. The response information includes information indicating that the APP 1 has operation permission on the API 1.

Optionally, an address of the API may be a uniform resource locator (Uniform Resource Locator, URL). An API list may include one or more API identifiers. The API identifier may be a sequence number or another identifier that may be used to uniquely identify an API or a type of APIs.

Optionally, in the foregoing implementation, the "operation permission" includes "calling permission", and the "operation" includes "calling". For example, if the APP 1 has operation permission on the API 1, it indicates that the APP 1 is allowed to call the API 1; and if the APP 1 has no operation permission on the API 1, it indicates that the APP 1 is not allowed to call the API 1. Certainly, the "operation permission" may further include other possible content such as one or more of "modification permission" and "replacement permission". The "modification permission" indicates that the APP has permission to modify the API. The "replacement permission" indicates that the APP may replace the API with other content.

In an implementation, the certificate of the APP includes the content (a). The API may be a URL. To reduce the space occupied by the certificate, operation permission of the APP on each API may be represented using a bitmap. For example, each API in an API list in the certificate of the APP is numbered using a binary bit, and operation permission of the APP on the API corresponding to the binary bit is represented using a value of a corresponding bit in a binary number. For example, it is assumed that the controller has four APIs, which are identified as an API 1, an API 2, an API 3, and an API 4, respectively. The API 1, the API 2, the API 3, and the API 4 may sequentially correspond to a binary bit, and a binary sequence ABCD is obtained. A corresponds to the API 1 and A is used as an identifier of the API 1. A binary value of A may represent operation permission of the APP 1 on the API 1. Cases of BCD are similar to A. Optionally, a binary bit corresponding to an API that the APP has permission to access may be set to 1, and a binary bit corresponding to an API that the APP has no permission to access is set to 0, and vice versa. For example, access permission of the APP on the API 1, the API 2, the API 3, and the API 4 corresponds to values of four binary bits, respectively. If the APP has permission to operate the API 1 and the API 2, but has no permission to operate the API 3 and the API 4, a value of operation permission of the APP on all the APIs of the controller is 1100. The certificate of the APP includes the value 1100 of the operation permission of the APP on the four APIs. When the controller determines that the value, included in the certificate provided by the APP, of the operation permission on all the APIs of the controller is 1100, the controller determines that the APP has permission to access the API 1 and the API 2 of the controller, but has no permission to access the API 3 and the API 4 of the controller.

In an implementation, if the certificate provided by the APP includes the content (b), the certificate of the APP includes one or more API identifiers. The one or more API identifiers are used to indicate that the APP has permission to operate APIs identified by the one or more API identifiers.

In an implementation, if the certificate provided by the APP includes the content (c), the certificate of the APP includes one or more API identifiers. The one or more API identifiers are used to indicate that the APP has no permission to operate APIs identified by the one or more API identifiers.

In an implementation, a plurality of APIs of the controller are divided into a plurality of API identifier sets (API Set). Each API set may include one or more API identifiers. Each API set may be used to identify a group of particular resources. In an implementation, the APP has same operation permission on APIs identified by API identifiers in the API identifier set. In another implementation, the APP may have different operation permission on the APIs identified by the API identifiers in the API identifier set. A plurality of APIs on which operation permission is different form one access permission combination. If the APP has permission to access the API identifier set, the APP has permission to operate the access permission combination. The certificate provided by the APP may include one or more API sets. For example, the controller has four APIs, and identifiers of the four APIs are API 1, API 2, API 3, and API 4, respectively. An API set 1 includes the API 1 and the API 2, an API set 2 includes the API 3, and an API set 3 includes the API 4. In an implementation, a list of API identifiers that are included in an API set is used to indicate that the APP has permission to operate APIs in the API set. In this case, if the APP 1 has permission to operate the API 1 and the API 2, but has no permission to operate the API 3 and the API 4, a certificate of the APP 1 includes only the API set 1, and does not include the API set 2 and the API set 3. In another implementation, a list of API identifiers that are included in an API set is used to indicate that the APP has no permission to operate APIs in the API set, but has permission to operate an API of the N APIs except the API set. In this case, if the APP 1 has permission to operate the API 1 and the API 2, but has no permission to operate the API 3 and the API 4, the certificate of the APP 1 includes only the API set 2 and the API set 3, and does not include the API set 1.

Figure 8:
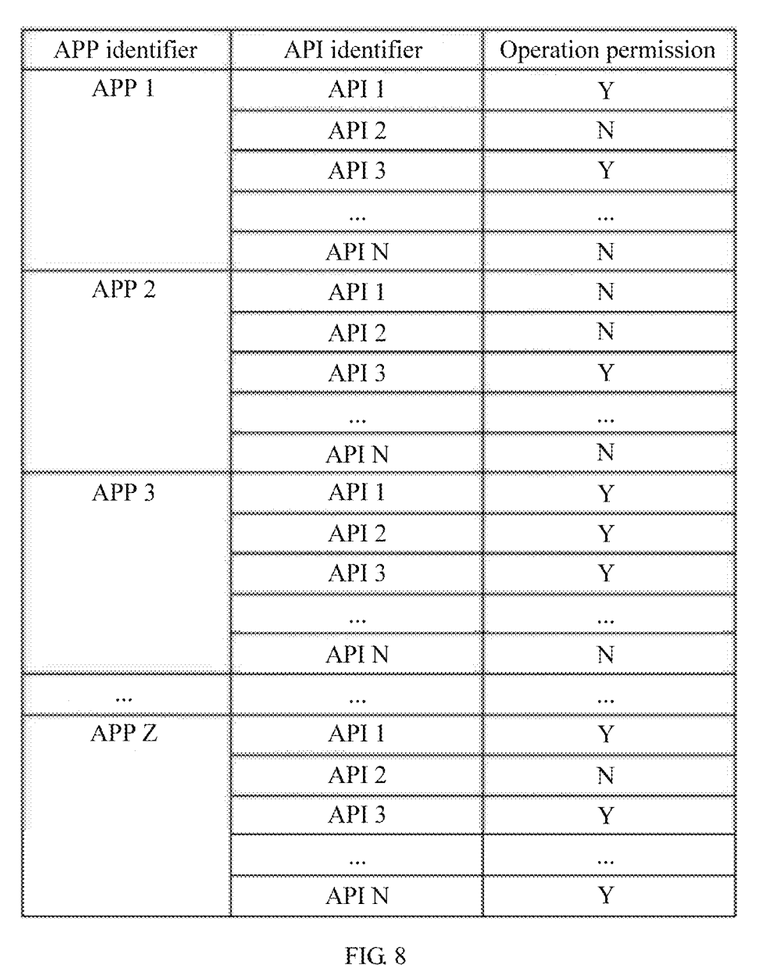
FIG. 8 is a schematic composition diagram of a policy data entry according to an embodiment of this application.
Figure 9:
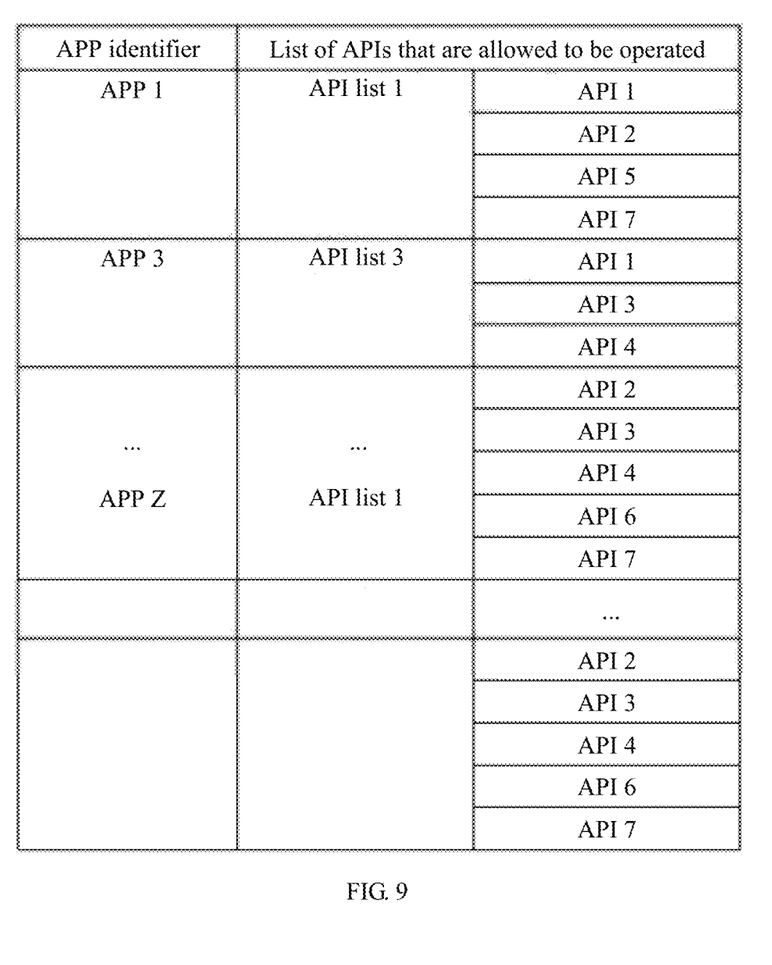
FIG. 9 is a schematic composition diagram of another policy data entry according to an embodiment of this application.
Figure 10:
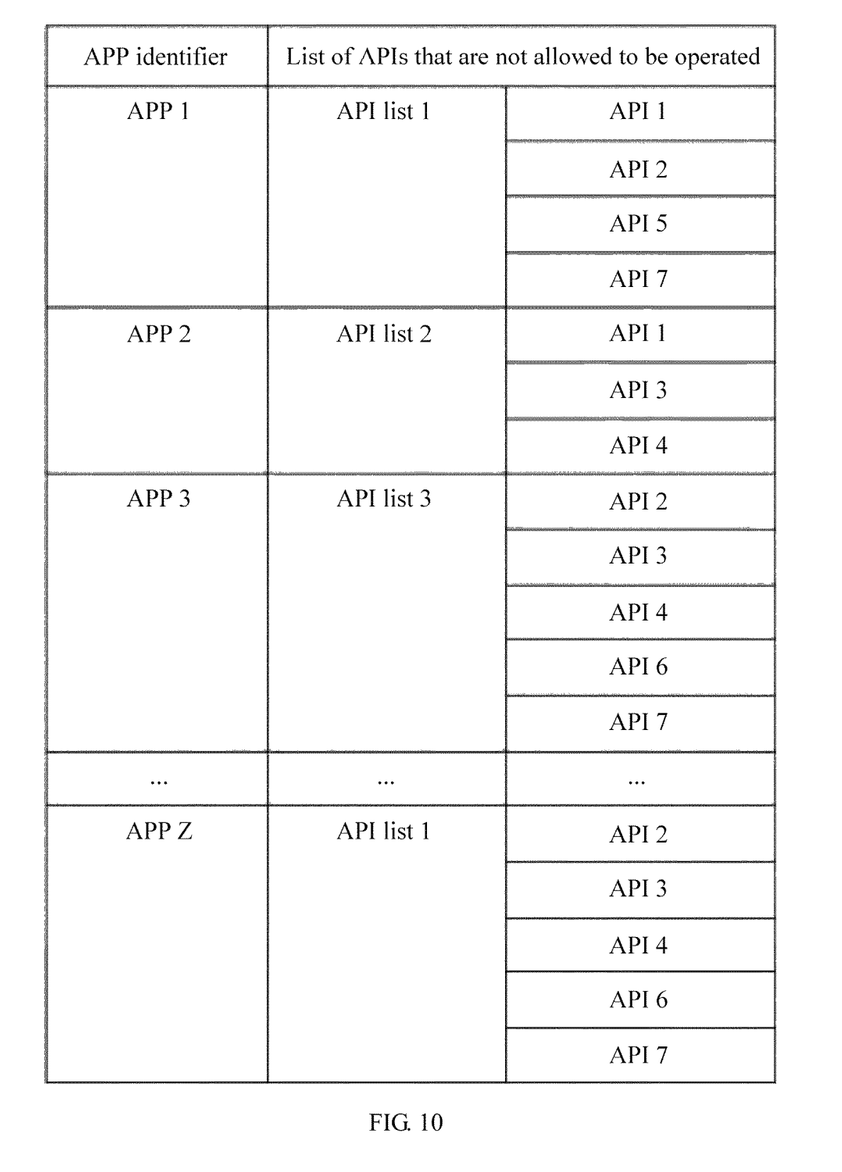
FIG. 10 is a schematic composition diagram of still another policy data entry according to an embodiment of this application.

In an implementation, information that is about operation permission of the APP on an API of the controller and that is obtained by the authentication device may be saved in a policy data entry manner in the authentication device, the controller, or another storage device communicating with the authentication device. A format and content of a policy data entry are shown in FIG. 8 to FIG. 10, including one or more of (a') to (c'): (a') a mapping relationship between an APP identifier and operation permission of the APP on the N APIs of the controller, (b') a mapping relationship between the APP identifier and the identifiers of the L APIs that are of the N APIs and that the APP has permission to operate, and (c') a mapping relationship between the APP identifier and the identifiers of the R APIs that are of the N APIs and that the APP has no permission to operate.

According to FIG. 8, for any APP, for example, an APP 1, a policy data entry of the APP 1 includes an APP identifier, namely, APP 1, and operation permission of the APP 1 on all APIs of the controller. Y indicates that the APP 1 has operation permission on a corresponding API, and N indicates that the APP 1 has no operation permission on the API. Certainly, the operation permission may be represented using other symbols. For example, a number or character is used to indicate that the APP 1 has operation permission on the API, and another different number or character is used to indicate that the APP 1 has no operation permission on the API.

According to FIG. 9, for an APP, for example, an APP 1, a policy data entry of the APP 1 includes an APP identifier, namely, APP 1, and a list of identifiers of APIs that are of all APIs of the controller and on which the APP 1 has operation permission, namely, API list 1. The API list 1 includes the identifiers of the APIs on which the APP 1 has operation permission, namely, API 1, API 2, API 5, and API 7.

According to FIG. 10, for an APP, for example, an APP 1, a policy data entry of the APP 1 includes an APP identifier, namely, APP 1, and a list of identifiers of APIs that are of all APIs of the controller and on which the APP 1 has no operation permission, namely, API list 1. The API list 1 includes the identifiers of the APIs on which the APP 1 has no operation permission, namely, API 1, API 2, API 5, and API 7.

In an implementation, the authentication device may maintain only one of (a'), (b'), or (c'), or maintain only a mapping relationship between an APP and an identifier of an API set that the APP has permission to operate. The mapping relationship is relatively static, and therefore it is convenient to maintain the authentication device. Optionally, a policy data entry included in the authentication device may be aged, to decrease a size of policy data.

In an implementation, the authentication device may be an independent network device such as a server, or may be a part of the controller.

Figure 11:
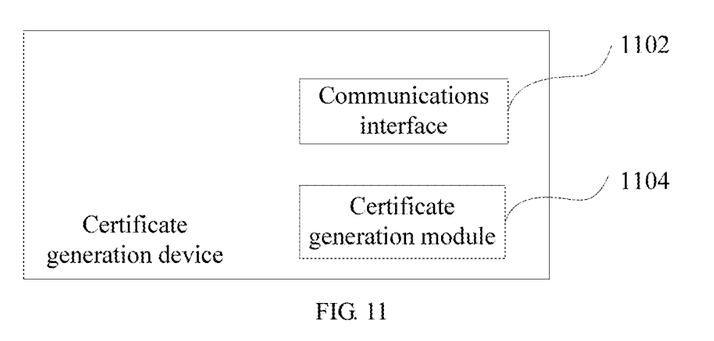
FIG. 11 is a schematic composition diagram of a certificate generation device according to an embodiment of this application.

As shown in FIG. 11, the certificate generation device shown in FIG. 2 includes a communications interface 1102 and a certificate generation module 1104. The communications interface 1102 is configured to: receive certificate application information, and send the certificate application information to the certificate generation module, where the certificate application information includes an application APP. The certificate generation module 1104 is configured to: receive the certificate application information sent by the communications interface, and generate a certificate according to the APP in the certificate application information, where the certificate includes one or more of (a) to (c). The communications interface may be further configured to return the certificate including information about operation permission of the APP on an API of a controller to a network device sending the certificate application information. In addition, the certificate generation device may further include a security detection module 1106, configured to: perform security detection on the APP received by the communications interface 1102, to determine a security feature of the APP, and after determining the security feature of the APP, determine an API that is of the controller and that the APP has permission to operate. Optionally, the certificate generation device may not include the security detection module 1106. Instead, an independent security detection device is disposed outside the certificate generation device. The security detection device performs security detection on the APP received by the communications interface 1102, to determine the security feature of the APP, and after determining the security feature of the APP, determines the API that is of the controller and that the APP has permission to operate. Optionally, the certificate generation module 1104 may be implemented using a central processing unit CPU, an application-specific integrated circuit (ASIC), or a field-programmable gate array (FPGA).

Figure 12:
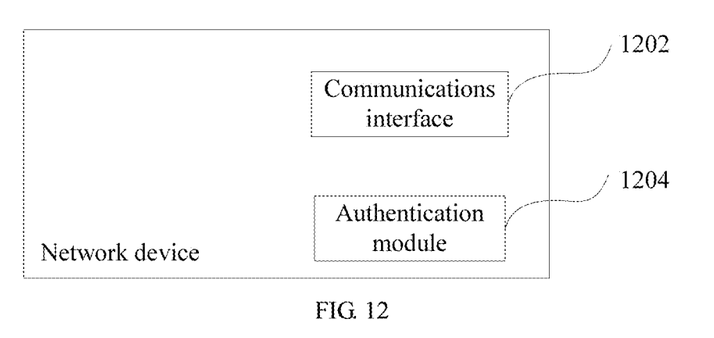
FIG. 12 is a schematic composition diagram of a network device according to an embodiment of this application.

As shown in FIG. 12, the authentication device shown in FIG. 4 includes a communications interface 1202 and an authentication module 1204. The communications interface 1202 is configured to receive an access request message of an application APP, where the access request message includes a digital certificate, and the digital certificate includes one or more of (a) to (c). The authentication module 1204 is configured to determine operation permission of the APP on the N APIs based on the information about operation permission. Optionally, the authentication module 1204 may be implemented using a CPU, an ASIC, or an FPGA. Optionally, the authentication device may be any network device that can implement the foregoing authentication method. The authentication device may be a network device independent of a controller, or may be a part of the controller. When the authentication device is a part of the controller, the authentication device may be implemented by a physical component or a software module.

Another aspect of this application provides a network device. The network device includes a processor and a memory communicating with the processor. When running an instruction or a computer program stored in the memory, the processor may perform the foregoing certificate generation method or authentication method.

Still another aspect of this application provides a computer readable storage medium. The computer readable storage medium stores an instruction. When the instruction is run on a computer, the computer is enabled to perform the foregoing certificate generation method or authentication method.

Still another aspect of this application provides a computer program product including an instruction. When the computer program product is run on a computer, the computer is enabled to perform the foregoing certificate generation method or authentication method.

All or some of the foregoing embodiments may be implemented by software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, all or some of the procedures or functions described in the embodiments of the present application are generated. The computer may be a general-purpose computer, a special-purpose computer, a computer network, or another programmable apparatus. The computer instructions may be stored in a computer readable storage medium, or may be transmitted using the computer readable storage medium. The computer instructions may be transmitted from a website station, a computer, a server, or a data center to another website station, computer, server, or data center in a wired manner (for example, a coaxial cable, an optical fiber, or a digital subscriber line (DSL)) or in a wireless manner (for example, infrared, radio, or microwave). The computer readable storage medium may be any available medium that can be accessed by a computer. For example, the computer instructions may be stored or transmitted using a magnetic medium (for example, a floppy disk, a hard disk, or a tape), an optical medium (for example, a DVD), or a semiconductor medium (for example, a solid state disk (SSD)).

In the several embodiments provided in this application, it should be understood that the disclosed system, apparatus, and method may be implemented in other manners. For example, the described apparatus embodiments are merely an example. For example, the unit or module division is merely logical function division and may be other division during actual implementation. For example, a plurality of units or components may be combined or integrated into another system, or some features may be ignored or may not be performed. In addition, the displayed or discussed mutual couplings or direct couplings or communications connections may be implemented using some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units/modules in the embodiments of the present application may be integrated into one processing unit/module, or each of the units/modules may exist alone physically, or two or more units/modules may be integrated into one unit. The integrated unit may be implemented in a form of hardware, or may be implemented in a form of hardware in addition to a software functional unit. For example, the authentication module, the certificate generation module, and the like may all be implemented using a CPU, an ASIC, or an FPGA.

When the foregoing integrated unit is implemented in a form of a software functional unit, the integrated unit may be stored in a computer readable storage medium. The software functional unit is stored in a storage medium and includes several instructions for instructing a computer device (which may be a personal computer, a server, a network device, or the like) to perform some of the steps of the methods described in the embodiments of the present application. The foregoing storage medium includes various media that can store program code, such as a USB flash drive, a removable hard disk, a read-only memory (ROM), a random access memory (RAM), a magnetic disk, or a compact disc.

The foregoing descriptions are merely example implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A certificate obtaining method, comprising:
sending, by a network device comprising an application (APP), certificate application information to a certificate issuing device, wherein the certificate application information comprises information of the APP;
receiving, by the network device, a certificate that is of the APP and that is from the certificate issuing device, wherein the certificate is generated according to the APP, wherein the certificate provides permission authentication when the APP accesses an application programming interface (API) of a controller,
wherein the certificate comprises information about operation permission of the APP on N APIs of the controller, identifiers of L APIs that are of the N APIs and that the APP has permission to operate, and identifiers of R APIs that are of the N APIs and that the APP does not have permission to operate,
wherein N is a natural number greater than or equal to 1,
wherein L is a natural number greater than or equal to 1 and less than or equal to N,
wherein R is a natural number greater than or equal to 1 and less than or equal to N, and
wherein the controller comprises: a data-control interface configured to send a forwarding table to one or more network elements such that the one or more network elements forward data according to the forwarding table; and an application-control interface in communication with one or more APPs including the APP, wherein the one or more APPs are configured to perform operations by accessing one or more of the N APIs on the controller.

2. The certificate obtaining method according to claim 1, wherein the information about operation permission comprises identifiers of the N APIs and operation permission of the APP on each of the N APIs.

3. The certificate obtaining method according to claim 1, wherein the information about operation permission comprises identifiers of M API identifier sets, wherein an identifier of each of the M API identifier sets identifies operation permission on K APIs in a respective M API identifier set, wherein M is a natural number greater than or equal to 1, and wherein K is an integer greater than or equal to 0 and less than or equal to N.

4. The certificate obtaining method according to claim 1, wherein the certificate comprises the information about operation permission of the APP on the N APIs of the controller, wherein the operation permission is represented using a bitmap, wherein each of the L APIs that the APP has permission to operate is identified in the bitmap using a first binary bit, and wherein each of the R APIs that the APP does not have permission to operate is identified in the bitmap using a second binary bit.

5. The certificate obtaining method according to claim 1, wherein one or more of the information, the identifiers of L APIs, or the identifiers of R APIs are carried in extended information of the certificate, and wherein the extended information includes a type field, a default field, and a value field.

6. An authentication method, comprising:
receiving, by an authentication device, an access request message of an application (APP), wherein the access request message comprises a digital certificate, wherein the digital certificate comprises information about operation permission of the APP on N application programming interfaces (APIs) of a controller; identifiers of L APIs that are of the N APIs and that the APP has permission to operate, or identifiers of R APIs that are of the N APIs and that the APP does not have permission to operate, wherein N is a natural number greater than or equal to 2, wherein L is a natural number greater than or equal to 1 and less than or equal to N, and wherein R is a natural number greater than or equal to 1 less than or equal to N; and determining, by the authentication device, operation permission of the APP on the one or more APIs based on the digital certificate, wherein the controller comprises: a data-control interface configured to send a forwarding table to one or more network elements such that the one or more network elements forward data according to the forwarding table; and an application-control interface in communication with one or more APPs including the APP, wherein the one or more APPs are configured to perform operations by accessing one or more of the N APIs on the controller.

7. The authentication method according to claim 6, wherein the information about operation permission comprises identifiers of the N APIs and operation permission of the APP on each of the N APIs.

8. The authentication method according to claim 6, wherein the information about operation permission comprises identifiers of M API identifier sets, wherein an identifier of each of the M API identifier sets identifies operation permission on K APIs in a respective M API identifier set, wherein M is a natural number greater than or equal to 1, and wherein K is an integer greater than or equal to 0 and less than or equal to N.

9. The authentication method according to claim 6, wherein the operation permission is represented using a bitmap when the digital certificate comprises the operation permission of the APP on the N APIs of the controller, wherein the operation permission of the APP is represented using a binary bit in the bitmap, wherein the binary bit is set to a first value or a second value, wherein each of the L APIs that the APP has permission to operate is represented in the bitmap using the first value, and wherein each of the R APIs that the APP does not have permission to operate is represented in the bitmap using the second value.

10. The authentication method according to claim 6, wherein one or more of the information, the identifiers of L APIs, or the identifiers of R APIs are carried in extended information of the certificate.

11. A certificate generation device, comprising:
a communications interface configured to receive certificate application information and send the certificate application information, wherein the certificate application information comprises an application (APP); and
a certificate generation module configured to receive the certificate application information from the communications interface and generate a certificate according to the APP in the certificate application information,
wherein the certificate comprises information about operation permission of the APP on N application programming interfaces (APIs) of a controller, identifiers of L APIs that are of the N APIs and that the APP has permission to operate, or identifiers of R APIs that are of the N APIs and that the APP has no permission to operate, wherein N is a natural number greater than or equal to 2,
wherein L is a natural number greater than or equal to 1 and less than or equal to N,
wherein R is a natural number greater than or equal to 1 and less than or equal to N, and
wherein the controller comprises: a data-control interface configured to send a forwarding table to one or more network elements such that the one or more network elements forward data according to the forwarding table; and an application-control interface in communication with one or more APPs including the APP, wherein the one or more APPs are configured to perform operations by accessing one or more of the N APIs on the controller.

12. The certificate generation device according to claim 11, wherein the information about operation permission comprises identifiers of the N APIs and operation permission of the APP on each of the N APIs.

13. The certificate generation device according to claim 11, wherein the information about operation permission comprises identifiers of M API identifier sets, wherein an identifier of each of the M API identifier sets identifies operation permission on K APIs in a respective M API identifier set, wherein M is a natural number greater than or equal to 1, and wherein K is a natural number greater than or equal to 1 and less than or equal to N.

14. The certificate generation device according to claim 11, wherein the operation permission is represented using a bitmap when the certificate comprises the operation permission of the APP on the N APIs of the controller, wherein each of the L APIs that the APP has permission to operate is identified using a first binary bit in the bitmap, and wherein each of the R APIs that the APP does not have permission to operate is identified using a second binary bit in the bitmap.

15. The certificate generation device according to claim 11, wherein one or more of the information, the identifiers of L APIs, or the identifiers of R APIs are carried in extended information of the certificate.

16. A controller, comprising:
N application programming interfaces (APIs), wherein N is a natural number greater than or equal to 2;
an application-control interface configured to receive an access request message of an application (APP) in communication with the controller, wherein the access request message comprises a digital certificate, wherein the digital certificate comprises information about operation permission of the APP on the N APIs of the controller, identifiers of L APIs that are of the N APIs and that the APP has permission to operate, or identifiers of R APIs that are of the N APIs and that the APP has no permission to operate, wherein L is a natural number greater than or equal to 1 and less than or equal to N, and wherein R is a natural number greater than or equal to 1 less than or equal to N;
an authenticator coupled to the communications interface and configured to determine operation permission of the APP on the N APIs based on the digital certificate; and
a data-control interface configured to send a forwarding table to one or more network elements such that the one or more network elements forward data according to the forwarding table.

17. The controller according to claim 16, wherein the information about operation permission comprises identifiers of the N APIs and operation permission of the APP on each of the N APIs.

18. The controller according to claim 16, wherein the information about operation permission comprises identifiers of M API identifier sets, wherein an identifier of each of the M API identifier sets identifies operation permission on K APIs in a respective M API identifier set, wherein M is a natural number greater than or equal to 1, and wherein K is a natural number greater than or equal to 1 and less than or equal to N.

19. The controller according to claim 16, wherein the operation permission is represented using a bitmap when the digital certificate comprises the operation permission of the APP on the N APIs of the controller, wherein each of the L APIs that the APP has permission to operate is identified in the bitmap using a first binary bit, and wherein each of the R APIs that the APP does not have permission to operate is identified in the bitmap using a second binary bit.

20. The controller according to claim 16, wherein one or more of the information, the identifiers of L APIs, or the identifiers of R APIs are carried in extended information of the digital certificate.

* * * * *